Dec. 26, 1950 W. O. LUERTZING 2,535,856
ADAPTER PLUG FOR CHEMICAL VESSELS
Filed March 24, 1948

INVENTOR
Walter O. Luertzing
BY
Pennie Edmonds Morton Barrows
ATTORNEYS

Patented Dec. 26, 1950

2,535,856

UNITED STATES PATENT OFFICE 2,535,856

ADAPTER PLUG FOR CHEMICAL VESSELS

Walter O. Luertzing, Vineland, N. J., assignor to Lurex Manufacturing Company, Vineland, N. J., a corporation of New Jersey Application March 24, 1948, Serial No. 16,712

6 Claims. (Cl. 73—343)

This invention relates to chemical apparatus of the type ordinarily used in laboratories in analytical and similar work and made up of a plurality of elements connected together and capable of being taken apart. More particularly, the invention is concerned with a novel adapter for use in making connections between parts of such apparatus, and with novel apparatus, in the assembling of which the adapter is employed. By the use of the adapter, a hermetically sealed, easily releasable ball and socket connection may be made between an element having a concave seat, and a second element, which has an enlargement formed with a ground surface of tapering diameter and intended to be received in a tapering socket. An instance of such use is the mounting of a thermometer in a flask or other part of a distilling apparatus and, since the advantages of the invention are fully realized in that application, such an assembly will be illustrated and described for purposes of explanation.

At the present time, it is the common practice to construct thermometers, which are to be used for indicating the temperature within a vessel, with means by which they can be hermetically sealed in an opening in the wall of the vessel. For this purpose, such a thermometer is formed between its ends with an enlargement of plug form, the outer surface of which is ground and of tapering diameter toward the bulb end of the thermometer. The wall of the vessel is then formed with an opening surrounded by a ground surface of a taper corresponding to that of the enlargement, so that the thermometer can be mounted in the opening with the two ground surfaces in tight contact. While the mounting of the thermometer in such a socket to make a hermetically sealed joint is relatively simple, the glass ordinarily used for the vessel has a lower coefficient of expansion than the glass used for the thermometer and, as a result, the thermometer frequently seizes in the socket to such an extent that it can not be removed except by the application of force, which may cause breakage of the thermometer. To overcome this difficulty, it has been proposed to form such a thermometer between its ends with an enlargement having a ground surface of spherical curvature, to provide the vessel with a concave ground seat of similar curvature, and to hold the thermometer in place with the ground surfaces in contact by clamping means. While such an arrangement would avoid the objectionable seizing of the thermometer in its socket, it is not commercially practical to make the thermometer with the ground surface of spherical curvature, because the portions of the thermometer stem on either side of the enlargement interfere with the grinding operation.

The present invention is, accordingly, directed to the provision of a novel adapter, by which an element having a portion with a surface of tapering diameter, can be mounted with a hermetic ball and socket connection in the concave seat of another element. The new adapter consists essentially of a tubular body having a circumferential enlargement at one end, the surface of the enlargement which faces outwardly being formed with a zone having a ground surface of a spherical curvature. The passage through the body has a ground surface of tapering diameter with its smallest diameter lying within the zone of the adapter. The curvature of the surface of the zone corresponds to that of the ground concave surface of the socket around an opening in the element, with which the adapter is to be used, and the taper of the surface of the passage through the adapter corresponds to the taper of the enlargement on the element to be mounted in the adapter.

For a better understanding of the invention, reference may be had to the accompanying drawing, in which Fig. 1 is a view of the new adapter in side elevation;

Figure 3:
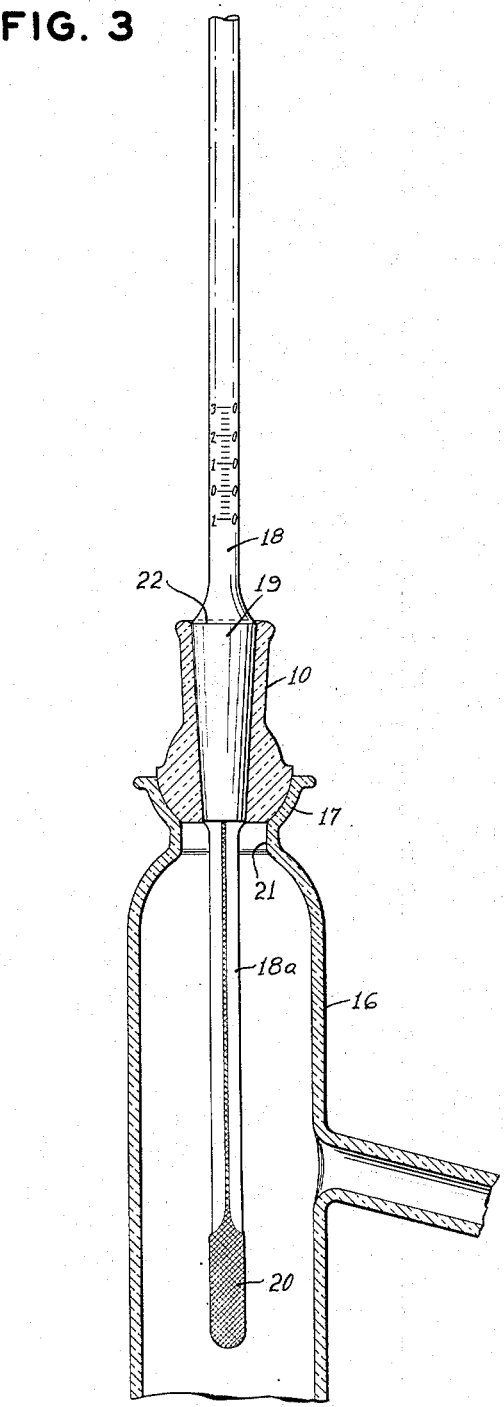
Fig. 3 is a view, partly in vertical section and partly in elevation, of portions of a chemical apparatus in the assembling of which the adapter was employed.
Figure 1:
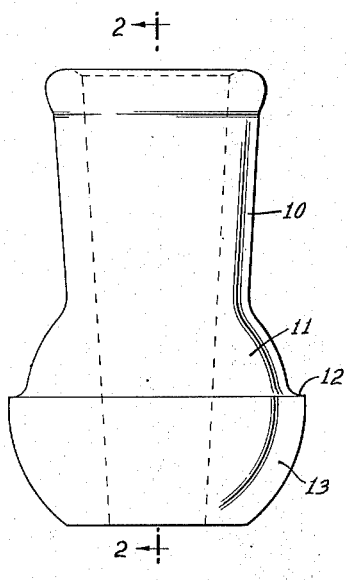
Figure 2:
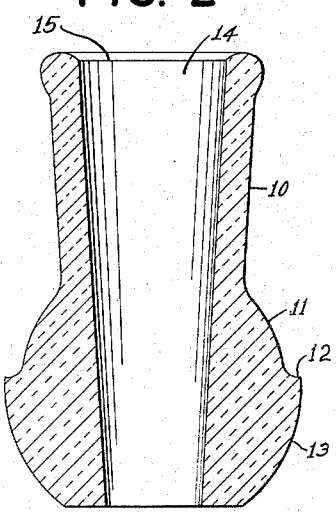
Fig. 2 is a sectional view on the line 2—2 of Fig. 1.

The adapter of the invention comprises a tubular body 10 of glass, preferably of approximately the same coefficient of expansion as that of the vessel with which the adapted is to be mounted. The body has a circumferential generally spherical enlargement 11 at one end and the enlargement is preferably formed with a circumferential shoulder 12, beyond which there is a zone 13 of the enlargement facing outwardly and having a ground surface of substantially spherical curvature. The passage 14 through the body has a ground surface and is of tapering diameter at the enlarged end of the body. The ground surface of the passage extends from the outer end of the enlargement substantially to the opposite end of the body, preferably terminating a short distance inwardly from the latter end, as indicated at 15.

An example of the use of the adapter is illustrated in Fig. 3, in which there is shown at 16 the end of a vessel having an opening at its upper end surrounded by a concave seat 17, the inner surface of which is ground and of a spherical curvature corresponding to that of zone 13 of the adapter. A thermometer 18 having an enlargement 19 of plug form with a ground surface of a taper corresponding to that of passage 14 through the adapter, is mounted in the latter with a tight fit. The lower part 18a of the stem of the thermometer extends through the adapter and into the interior of the vessel and has the usual bulb 20 at its lower end. With this arrangement, the joint between the ground surface of the zone 13 and the ground surface of the seat 17 may be readily broken by moving the adapter gently to the side, and the adapter and thermometer can then be removed as a unit. Under some conditions, the thermometer may seize in the adapter, but this is unimportant, since the two are to be used in conjunction.

In a vessel formed with a tapering socket to receive the plug enlargement of a thermometer, the lower end of the socket ordinarily lies at the top of the constriction 21 in the neck of the vessel and the socket wall extends up to about the level of the upper end 22 of the ground surface on the thermometer enlargement 19. By forming the adapter with the tapered passage 14 extending through the enlargement 11, the adapter, when seated in the concave socket 17 of the vessel, holds the thermometer with its bulb at about the same height, as if the thermometer were mounted directly in the usual tapered seat. Accordingly, when the adapter is used, the indications of the thermometer are not altered by reason of its bulb being at too high a level.

I claim:

1. An adapter for use in chemical apparatus which comprises a tubular glass body having a circumferential enlargement at one end, the enlargement having a zone facing outwardly, which has a ground surface of substantially spherical curvature, the passage through the body having a ground surface and being of tapering diameter with its smallest diameter substantially at the outer end of the enlargement.

2. An adapter for use in chemical apparatus which comprises a tubular glass body having a circumferential enlargement at one end, the enlargement having a circumferential radial shoulder and a zone facing outwardly beyond the shoulder, the surface of the zone being ground and of substantially spherical curvature, the passage through the body having a ground surface and being of tapering diameter with its smallest diameter substantially at the outer end of the enlargement.

3. An adapter as defined in claim 1 in which the passage through the body has a ground surface extending throughout its length.

4. In chemical apparatus for use with a vessel having an opening surrounded by a concave seat, an adapter comprising a tubular body having a circumferential enlargement at one end, the enlargement having a ground convex surface facing outwardly of a convexity to conform to the concavity of the seat of the vessel, the passage through the body having a ground tapering surface with its smallest diameter where the passage terminates at said convex surface, a member extending through the adapter and having a portion extending beyond the convex surface of the adapter a predetermined distance which it is desired said member shall extend into the vessel, a tapering enlargement on said member having a ground surface, the taper of said enlargement being the same as and engaging the taper of the passage through the body, the smaller end of the taper on the member being of substantially the same size as the smaller end of the tapered passage through the tubular body, whereby the smaller end of the tapered portion on the member terminates substantially at said convex surface of the adapter.

5. In chemical apparatus, the combination of a vessel having an opening surrounded by a concave seat having a ground surface of substantially spherical curvature, and an adapter of tubular form having an enlargement at one end, the enlargement having a ground surface of substantially spherical curvature fitting tightly against the ground surface of the seat, the passage through the adapter having a ground surface and being of tapering diameter with its smallest diameter substantially at the outer end of the enlargement.

6. In chemical apparatus, the combination of a vessel having an opening surrounded by a concave seat having a ground surface of substantially spherical curvature, an adapter of tubular form having an enlargement at one end, the enlargement having a ground surface of substantially spherical curvature fitting tightly against the ground surface of the seat, the passage through the adapter having a ground surface of tapering diameter with its smallest diameter substantially at the outer end of the enlargement, and an element having a tapered ground surface mounted in the adapter with the ground surface thereof in tight contact with the ground surface of the passage through the adapter.

WALTER O. LUERTZING.

REFERENCES CITED

The following references are of record in the file of this patent:

UNITED STATES PATENTS

| Number | Name | Date |
| --- | --- | --- |
| 2,052,713 | Juffa | Sept. 1, 1936 |
| 2,240,070 | Geyer | Apr. 29, 1941 |

OTHER REFERENCES

Fisher: Catalogue, Fisher Scientific Co., received U. S. Patent Office, March 4, 1942, S. L. Q. 185.F536, page 870. (This catalogue is available in the Scientific Lib. of the Pat. Off.)

Catalog No. LP28, copyright 1947, Corning Glass Works, Corning, N. Y., (page 124 relied on).